US007825615B2

(12) United States Patent
Chen et al.

(10) Patent No.: US 7,825,615 B2
(45) Date of Patent: Nov. 2, 2010

(54) INTELLIGENT MOTORIZED APPLIANCES WITH MULTIPLE POWER SOURCES

(75) Inventors: Yung Chen, Clarendon Hills, IL (US); Eric Junkel, Mount Prospect, IL (US)

(73) Assignee: GLJ, LLC, Chicago, IL (US)

( * ) Notice: Subject to any disclaimer, the term of this patent is extended or adjusted under 35 U.S.C. 154(b) by 258 days.

(21) Appl. No.: 11/873,138

(22) Filed: Oct. 16, 2007

(65) Prior Publication Data
US 2009/0096399 A1   Apr. 16, 2009

(51) Int. Cl.
*H02P 1/00* (2006.01)
(52) U.S. Cl. .................. 318/139; 318/440; 318/441
(58) Field of Classification Search ........... 318/139, 318/440, 441; 320/162, 103; 363/37
See application file for complete search history.

(56) References Cited

U.S. PATENT DOCUMENTS

| | | |
|---|---|---|
| 979,155 A | 12/1910 | Gugler |
| 1,468,096 A | 9/1923 | Young |
| 2,675,490 A | 4/1954 | Portail |
| 2,818,543 A | 12/1957 | Dodge |
| 3,259,829 A | 7/1966 | Feth |
| 3,360,708 A | 12/1967 | Palmer-Persen |
| 3,365,645 A | 1/1968 | Jacobs |
| 3,384,806 A | 5/1968 | Hartman |
| 3,417,307 A | 12/1968 | Kosa et al. |
| 3,421,067 A | 1/1969 | Wilson et al. |
| 3,594,627 A | 7/1971 | Lesher |
| 3,602,794 A | 8/1971 | Westhaver |
| 3,614,581 A | 10/1971 | Frost |
| 3,629,681 A | 12/1971 | Gurwicz |
| 3,667,026 A | 5/1972 | Bogut et al. |
| 3,767,995 A | 10/1973 | Kaminski et al. |
| 3,775,659 A | 11/1973 | Carlsen, II |
| 3,796,940 A | 3/1974 | Mauch et al. |
| 3,828,201 A | 8/1974 | Allen, Sr. |
| 3,919,615 A | 11/1975 | Niecke |
| 3,921,050 A | 11/1975 | Rowas |
| 3,987,352 A | 10/1976 | Hirota |
| 4,006,306 A | 2/1977 | Driscoll |
| 4,009,429 A | 2/1977 | Mullersman |
| 4,016,474 A | 4/1977 | Mason |
| 4,025,860 A | 5/1977 | Shibata et al. |
| 4,039,898 A | 8/1977 | Iwata et al. |
| 4,044,268 A | 8/1977 | Hammel et al. |
| 4,056,764 A | 11/1977 | Endo et al. |
| 4,080,557 A | 3/1978 | Hennion |
| 4,091,395 A | 5/1978 | Kozuki et al. |
| 4,108,341 A | 8/1978 | Pettinger |
| 4,134,057 A | 1/1979 | Portmann |
| 4,209,737 A | 6/1980 | Sugalski |
| 4,236,107 A | 11/1980 | Templin |
| 4,287,465 A | 9/1981 | Godard et al. |

(Continued)

*Primary Examiner*—Karen Masih
(74) *Attorney, Agent, or Firm*—Cook Alex Ltd.

(57) ABSTRACT

A motorized portable appliance which monitors, and automatically selects, one of multiple power sources. The motorized portable appliance includes an electric motor, a secondary battery and at least one other source of electrical power, and an automatic control to switch between the secondary battery and the other source of electrical power, which may be mains electrical power, an external secondary battery, an on-board secondary battery, an automotive battery, a solar photovoltaic array, or a primary battery. Power conditioning circuitry converts power from the various power sources to a form compatible with the electric motor and recovers remaining power from depleted primary batteries.

56 Claims, 3 Drawing Sheets

U.S. PATENT DOCUMENTS

| | | | |
|---|---|---|---|
| 4,489,268 A | 12/1984 | Beachy | |
| 4,502,000 A | 2/1985 | Mashikian | |
| 4,510,431 A | 4/1985 | Winkler | |
| 4,530,550 A | 7/1985 | Kondo | |
| 4,564,798 A | 1/1986 | Young | |
| 4,628,243 A | 12/1986 | Hodgman et al. | |
| 4,659,942 A | 4/1987 | Volp | |
| 4,670,703 A | 6/1987 | Williams | |
| 4,697,909 A | 10/1987 | Machida et al. | |
| 4,698,578 A | 10/1987 | Mullersman et al. | |
| 4,737,702 A | 4/1988 | Koenck | |
| 4,748,344 A | 5/1988 | Sing | |
| 4,818,928 A | 4/1989 | Schosser | |
| 4,835,409 A | 5/1989 | Bhagwat et al. | |
| 4,835,410 A | 5/1989 | Bhagwat et al. | |
| 4,849,682 A | 7/1989 | Bauer et al. | |
| 4,857,820 A | 8/1989 | Tompkins et al. | |
| 4,931,947 A | 6/1990 | Werth et al. | |
| 4,965,462 A | 10/1990 | Crawford | |
| 4,965,738 A | 10/1990 | Bauer et al. | |
| 5,002,840 A | 3/1991 | Kiebenow et al. | |
| 5,028,806 A | 7/1991 | Stewart et al. | |
| 5,039,929 A | 8/1991 | Veistroffer et al. | |
| 5,076,805 A | 12/1991 | Welch | |
| 5,097,184 A | 3/1992 | Echtler et al. | |
| 5,130,634 A | 7/1992 | Kasai | |
| 5,150,031 A | 9/1992 | James et al. | |
| 5,162,721 A | 11/1992 | Sato | |
| 5,182,546 A | 1/1993 | Shinbori et al. | |
| 5,184,059 A | 2/1993 | Patino et al. | |
| 5,204,610 A | 4/1993 | Pierson et al. | |
| 5,250,891 A | 10/1993 | Glasgow | |
| 5,268,629 A | 12/1993 | Franke | |
| 5,293,447 A * | 3/1994 | Fanney et al. | 392/449 |
| 5,315,228 A | 5/1994 | Hess et al. | |
| 5,316,868 A | 5/1994 | Dougherty et al. | |
| 5,350,995 A | 9/1994 | Iketani | |
| 5,350,996 A | 9/1994 | Tauchi | |
| 5,355,072 A | 10/1994 | Satsuma et al. | |
| 5,363,312 A | 11/1994 | Ninomiya | |
| 5,530,296 A * | 6/1996 | Masaki | 307/75 |
| 5,565,756 A | 10/1996 | Urbish et al. | |
| 5,602,481 A | 2/1997 | Fukuyama | |
| 5,633,573 A | 5/1997 | Van Phuoc et al. | |
| 5,677,614 A | 10/1997 | Ohmori et al. | |
| 5,715,156 A | 2/1998 | Yilmaz et al. | |
| 5,726,551 A | 3/1998 | Miyazaki et al. | |
| 5,774,733 A | 6/1998 | Nolan | |
| 5,780,980 A | 7/1998 | Naito | |
| 5,780,993 A | 7/1998 | Tsang | |
| 5,793,185 A | 8/1998 | Prelec et al. | |
| 5,793,186 A * | 8/1998 | Watabe et al. | 320/112 |
| 5,793,187 A | 8/1998 | DeBauche | |
| 5,831,350 A | 11/1998 | McConkey et al. | |
| 5,973,476 A | 10/1999 | Irvin | |
| 6,007,373 A | 12/1999 | Chew | |
| 6,025,695 A | 2/2000 | Friel et al. | |
| 6,057,670 A | 5/2000 | Sink et al. | |
| 6,087,815 A | 7/2000 | Pfeifer et al. | |
| 6,104,162 A | 8/2000 | Sainsbury et al. | |
| 6,118,253 A | 9/2000 | Mukainakano et al. | |
| 6,154,007 A | 11/2000 | Shaver et al. | |
| 6,181,101 B1 | 1/2001 | Arai et al. | |
| 6,204,636 B1 | 3/2001 | Kinoshita et al. | |
| 6,262,559 B1 | 7/2001 | Eggert et al. | |
| 6,262,560 B1 | 7/2001 | Lionberg et al. | |
| 6,268,709 B1 | 7/2001 | Lee et al. | |
| 6,285,159 B1 | 9/2001 | Ki et al. | |
| 6,288,518 B1 | 9/2001 | Yang et al. | |
| 6,291,967 B1 | 9/2001 | Higuchi | |
| 6,331,365 B1 | 12/2001 | King | |
| 6,362,596 B1 | 3/2002 | Brotto | |
| 6,364,696 B1 | 4/2002 | Amazutsumi | |
| 6,473,630 B1 | 10/2002 | Beranowski et al. | |
| 6,479,963 B1 | 11/2002 | Manor et al. | |
| 6,479,964 B2 | 11/2002 | Woodroffe et al. | |
| 6,551,123 B1 * | 4/2003 | Schaeffeler et al. | 439/374 |
| 6,566,843 B2 | 5/2003 | Takano et al. | |
| 6,597,572 B2 | 7/2003 | Nishikawa et al. | |
| 6,600,237 B1 | 7/2003 | Meissner | |
| 6,600,293 B2 | 7/2003 | Kikuchi | |
| 6,639,381 B2 | 10/2003 | Tamura et al. | |
| 6,727,602 B2 | 4/2004 | Olson | |
| 6,747,439 B2 * | 6/2004 | Franke | 320/133 |
| 6,909,201 B2 | 6/2005 | Murty et al. | |
| 6,953,329 B2 | 10/2005 | Rardin | |
| 6,989,653 B2 | 1/2006 | Iwata et al. | |
| 7,015,674 B2 | 3/2006 | VonderHaar | |
| 7,015,675 B1 | 3/2006 | Andre | |
| 7,038,333 B2 | 5/2006 | Bourilkov et al. | |
| 7,049,792 B2 | 5/2006 | King | |
| 7,061,138 B2 | 6/2006 | Richter et al. | |
| 7,078,879 B2 | 7/2006 | Makhija | |
| 7,093,668 B2 | 8/2006 | Gass et al. | |
| 7,095,210 B2 | 8/2006 | Tamura et al. | |
| 7,183,745 B2 | 2/2007 | Kubale et al. | |
| 2001/0017531 A1 | 8/2001 | Sakakibara et al. | |
| 2002/0008495 A1 | 1/2002 | Dougherty et al. | |
| 2003/0107352 A1 | 6/2003 | Downer et al. | |
| 2003/0137283 A1 * | 7/2003 | Isomichi et al. | 320/162 |

* cited by examiner

FIG. 3

INTELLIGENT MOTORIZED APPLIANCES WITH MULTIPLE POWER SOURCES

FIELD OF THE INVENTION

The present invention relates generally to methods and apparatus for providing a wider variety of power sources for electrically-powered portable motorized tools and appliances, such as fans, power sprayers, drills and the like. More particularly, the present invention relates to the means of interconnecting the various power sources to the tools and appliances, and to the control of the interconnects to the various power sources in an optimal fashion.

BACKGROUND OF THE INVENTION

Standard terminology in the battery industry will be used to describe battery construction. A cell is a single unit of a battery with a known potential based upon the chemistry of the cell. A number of cells in series is a battery. Primary type batteries convert chemical potential energy into electric current and are not ordinarily rechargeable. Alkaline batteries and carbon-zinc batteries are examples of primary batteries.

Secondary batteries are rechargeable. Typical types of secondary batteries are nickel cadmium, nickel metal hydride, lithium ion and the ubiquitous lead-acid type. Small, portable fuel cells that convert hydrocarbon fuel into electric power will also be considered as primary batteries, although they can be refilled and reused like secondary batteries. Such fuel cells may be used in the future in portable electronic devices, such as cell phones and laptop computers.

The term "mains power" will be used to describe any source of electrical power that is continuously available and is not generally exhaustible by a tool or appliance. Some examples of mains power include the standard 115 VAC, 60 Hz power from wall receptacles found in every home and office, the 12 VDC to 13.8 VDC power available from the cigarette lighter socket found on an automobile dashboard, and the 12 VDC supplied by a domestic solar photovoltaic array. Mains power is typically much less costly than use of primary or secondary batteries for the same amount of power supplied. Of course, batteries have the advantage of portability over mains power.

Tools and appliances that operate solely off of mains power are outside the scope of the present invention. The present invention is concerned with portable or cordless devices which use an on-board source of electrical power. On the less expensive end are devices which operate using primary batteries. Once the battery, or set of cells, is exhausted, it must be replaced at some cost. This may be acceptable for tools which are used intermittently and/or used infrequently since the tool may remain in a high state of readiness for years. Initial cost may also be lower since primary batteries are much less costly than secondary batteries for the same power output.

For tools and appliances which must be used frequently, and which cannot be practically connected to mains power, rechargeable (secondary) batteries are a viable option. Batteries of many cells with voltages of up to 36 VDC for portable tools can be recharged in hours. A construction worker may take a couple of batteries on site and work for hours without needing a connection to the mains power. The much higher cost of the rechargeable batteries can be amortized over hundreds of charges.

The cost of the rechargeable batteries can also be kept down if the same battery can be used with many different tools, such as a drill motor, a jigsaw, a flashlight, a sander, or the like. A battery can be "borrowed" from an infrequently used tool and be placed on a tool which is more frequently used, such as a drill motor, or a tool which draws more power and exhausts the battery more quickly, such as a circular saw.

Secondary batteries tend to self-discharge over time. Thus, they may not be the best choice for standby or intermittent use unless they have a continuous source of charging current to keep them fully charged. Typically, designs of the rechargeable battery packs are proprietary to the tool manufacturer. Thus, they are not interchangeable between manufacturers, or even between different lines of tools from the same manufacturer. If an older battery pack design is no longer offered for sale, the tools which utilize that pack can no longer be used after the existing rechargeable batteries have exceeded their normal life. Adapters to accommodate new style battery packs can be used in only isolated instances and only if the new battery packs supplies the same voltage as the tool uses.

Newer rechargeable batteries typically use non-toxic materials in their construction and are more eco-friendly than primary cells, which take up the same volume but which are disposed of hundreds of times more often. In fact, most types of rechargeable batteries are recycled to reclaim their metallic content.

Rechargeable cells are made to fit the same form factor as standard primary cells (size AAA, AA, C, D, and the like), but rechargeable cells do not typically store as much energy or have as high a voltage. For example a typical voltage for a rechargeable cell is about 1.2 VDC as compared to about 1.5 VDC for a primary cell. Therefore, typical secondary batteries must include more cells than primary batteries to obtain equivalent voltage outputs.

Battery capacity is measured in milliamp-hours. This is the output of the battery (in milliamps] integrated over time (until exhaustion) with the current draw at a specified rate. Higher capacity is usually better. The expression "C" is used to refer to a standard rate of charging and discharging a secondary battery and is determined by dividing the milliamp-hours by hours. Typical charging rates are between 0.1 C and 0.5 C. A very low charge rate is called a "trickle" charge. A trickle charge is typically used to overcome the tendency of a secondary battery to self-discharge.

Lead acid storage batteries, as commonly used in automobiles, have a large current capacity and can be used to generate AC power from its DC output by using a circuit known as an inverter. Among this type of batteries, there are starting batteries, which are good for short bursts of high current, and deep cycle batteries, which are intended to be discharged almost completely and then recharged for many cycles. Starting batteries tend to rapidly deteriorate if used in deep cycle applications.

Battery packs for rechargeable tools and appliances can be found in a wide range of voltages. Some appliances take two battery packs of the same type. It is not common for an appliance to be able to use battery packs of different voltages or different styles. However, it is common for a single battery charger station (operating off of mains power) to accept batteries of different voltages or different mechanical styles. It is not common for an appliance to use both primary and secondary batteries in the same appliance, although some electronic devices have a small primary cell to act as a backup battery for a clock or for a configuration memory. This primary cell does not provide the same function as the rechargeable battery nor does it interoperate with the rechargeable battery.

There are numerous methods of recharging secondary batteries. A major concern is to not overcharge the batteries since this will damage them internally, and reduce their current capacity. One recharging method is to monitor the temperature rise of the cells, since the internal temperature rises rapidly as full charge is approached. Another method is to monitor the charging voltage if the charging current is fixed. The charging voltage will plateau as the charging is completed. Simple chargers assume that the battery is fully discharged and supply a charging current to the battery for a fixed amount of time. Special integrated circuits (ICs) have been developed which supervise the automatic safe charging of batteries. These ICs provide output control signals when charging is complete and they can be programmed to work with different numbers of cells and different cell chemistries.

While battery operation of tools is usually very safe for the user, there is a particular hazard involved in use of removable cells or battery packs. If a number of cells in series connection have one cell reversed in polarity (installed backward), the other cells act to reverse charge the errant cell. This can damage a rechargeable battery permanently and also cause primary batteries to heat up and even leak a caustic electrolyte. A related hazard is use of both old and new batteries in the same series. Older batteries act as a drag on the fresher ones, wasting power. Similar effects are seen if different types of batteries are mixed in a series. Typically, mechanical interlocks are used to prevent reverse installation or to keep the circuit open in the case of incorrect installation of cells.

Most motor driven appliances operate at more than one speed. To achieve this speed control, many techniques and types of circuits are used. In the DC motor realm, low end speed control is achieved with a rheostat or adjustable resistor in series with the motor. Energy is dissipated in the resistor and the motor sees a lower voltage, thus slowing the motor. For lower power motors, a linear voltage regulator circuit may be used to adjust voltage applied to the motor terminals. More efficient motor controls use pulse width modulation (PWM) or pulse frequency modulation (PFM) techniques to provide adjustable (time averaged) voltages to a brush-type DC motor or to a brushless DC motor.

The current controller switches between ON and OFF conditions very quickly so that little energy is dissipated in the switch. Ideally, no current is conducted in the OFF state and no voltage drop occurs in the ON state. A capacitor on the output of the switch smoothes the voltage out so that the motor appears to see a near-DC voltage at some fraction of the supply voltage. The duty cycle of the switch determines the fraction of supply voltage that is output. This type of method can only reduce the voltage (and the power level) below that of the supply voltage.

Another kind of voltage control found in DC-DC power supplies uses inductors in the switching circuit to provide voltages higher or lower than the supply voltage. Some of the circuit topologies are known as flyback, SEPIC, and Cuk. They are still limited to power outputs lower than the power output of the supply voltage, as from a primary or secondary battery. They do, however, allow a circuit to use battery power at one voltage and provide another voltage and, further, to keep that voltage constant until the battery is exhausted, that is, until the power needed exceeds the maximum power that can be supplied.

In the art, there are numerous instances of electric fans which operate from mains power (AC), from DC mains (especially for automotive use) and from primary batteries. Fans powered from primary batteries may use secondary batteries of the same size but lower voltage. However, performance of the fan will not be as good due to the lower voltage. There are also instances of fans which use rechargeable batteries that are charged from the AC mains, such as the Circulair® Model 8020 aromatherapy diffuser. Some DC fans, such as the o2-cool® Model 1054 fan, can also operate off of the mains power using either an adapter for the automotive cigarette lighter socket, or a wall mount power unit in the case of AC mains.

Similarly, in the realm of portable motorized tools, such as drill motors, circular saws, sanders, or the like, such tools are typically operated from AC mains or from rechargeable battery packs. Some tools have the batteries built-in so that some external source of charging current must be supplied, such as at a socket or at a mating connector. Tools using rechargeable batteries are not intended to be operated directly off of the charging current because the charging current is typically much lower than the operating current required by the tool.

Another relevant type of product in the art is the power station. The power station is an enhanced battery charger/battery combination that can charge batteries, provide booster power from on-board secondary batteries and often house other kinds of battery operated devices such as radios, lanterns or the like. Examples include the Black and Decker® Storm Station and the Bosch® Power Box.

It should also be pointed out that the range of tools and appliances which are operated from rechargeable battery packs is increasing. For example, Black and Decker offers a charging station incorporating a radio. The radio can operate from the battery when mains power is off or interrupted. Ryobi has a 10" fan that only operates from an 18 VDC battery pack. The same battery pack operates many other different power tools which are included in the Ryobi® line.

The overall problem with selecting a portable fan, tool or appliance is to balance the needs for economy, portability and readiness, which are addressed differently by different power sources. Primary batteries are costly on a dollar per hour of operation basis, but have high readiness and portability. Rechargeable batteries are less costly over the life of the product and are almost as portable, However, rechargeable batteries suffer from so-so readiness. The user must constantly maintain the rechargeable batteries in a ready, or fully-charged, state for optimum performance.

Mains operation has average readiness and the best economy, but poor portability. Mains may be down in emergencies, such as storms and heat waves, or may not be found in remote areas.

If it is decided to utilize rechargeable batteries, the problem arises of having multiple incompatible tools/appliances and battery packs. For example, a Black and Decker® battery pack is incompatible with a Makita® saw, and neither manufacturer's battery pack works in a Ryobi® cordless sander. Even older packs from the same manufacturer do not work in newer, higher voltage tools, and vice versa. Readiness suffers because the user has battery packs or tools which cannot be used, or economy suffers because the user has to buy multiple battery packs and chargers to keep a given tool or appliance in a state of readiness for a full day of work between recharge cycles.

Another problem is that the more powerful cordless, especially rechargeable, motorized appliances require correspondingly heavier and bulkier battery packs. This extra weight makes them less portable and more susceptible to damage from dropping. Increased muscle strain and fatigue are encountered by the user due to the extra weight. Accuracy and productivity therefore suffer.

Another problem with the use of primary batteries is that the power output of the batteries is not constant over the lifetime of the battery. In certain applications, the power or speed needs to be constant for a tool to operate at peak effectiveness. Further, a substantial fraction of the original power of the battery remains even when the output voltage is too low to operate the tool. This residual power is discarded when the primary battery is discarded. This is not economical. Because of the low current output of partially depleted primary batteries (and other sources such as photovoltaic panels, fuel cells, or the like), the depleted power source is not capable of directly powering most motorized tools/appliances.

As previously noted, appliances with multiple, replaceable cells can be damaged if the user inadvertently reverses the polarity of one of the cells.

Therefore, there is a need for improved means of providing power for portable motorized tools, fans, appliances and the like that make the best use of primary batteries, secondary batteries and mains power in an economical fashion. There is also a need for improved means of increasing the readiness of the appliance and to extend the usable battery life. Another need is for improved means of having battery packs interoperate with different tools and appliances. There is also a need for improved means of effectively using low current sources such as solar cells and depleted primary batteries to operate power tools and fans. There is also a need for improved means of making portable tools lighter and easier to use for longer periods of time between charging and/or battery pack replacement.

A general object of the present invention is to therefore provide an improved multiple power source control for electrically powered portable motorized tools and appliances such as fans, power sprayers, and drill motors, to permit them to use a wider variety of power sources in an optimal fashion.

Another object of the present invention is to provide a means of interconnecting the various power sources to the motor and to provide control of the interconnects to the various power sources.

A further object of the present invention is to enhance the utility of existing tools and appliances with additional power supply options.

Yet another object of the present invention is to allow the user to keep using the appliance and/or tool for as long as possible away from mains power or without having to purchase fresh cells.

A still further object of the present invention is to provide improved means of effectively using low current sources such as solar cells and depleted primary batteries to operate power tools and fans.

SUMMARY OF THE INVENTION

The present invention is directed to a motorized portable appliance which assesses, and automatically selects, one of multiple power sources. The motorized portable appliance includes an electric motor, a secondary battery as a source of electrical power for the electric motor, at least one other source of electrical power for the electric motor, and an automatic control to switch between said secondary battery and the at least one other source of electrical power to provide electrical power to the electric motor. The other source of electrical power may be mains electrical power, such as from an AC adapter, from an automotive battery, or from a solar photovoltaic array, or a primary battery.

In one embodiment, the automatic control may include a power conditioning circuit to convert power from the secondary battery and from said other source of electrical power to provide electrical power at a voltage, phase, and frequency compatible with the electric motor. Preferably, the automatic control has a charging circuit to charge the secondary batteries from the mains electrical power. The automatic control may also include a sense means for detecting a reversed cell in a battery, a mix of battery types, a shorted battery, or a mix of old and new batteries. The sense means may activate an indicator upon detecting any such a condition. The automatic control may further include a voltage conversion means which uses residual power remaining in partially depleted primary batteries to recharge the secondary battery, and which uses current from solar photovoltaic cells to recharge the secondary batteries.

In another embodiment, the automatic control has a receptacle for receiving additional secondary batteries to increase power capacity. The receptacle includes an adapter for mechanically and electrically mating an external secondary battery with the motorized portable appliance. The automatic control includes a charging means to charge the secondary battery from the external secondary battery.

In a further embodiment, the power conditioning circuit and the on-board secondary battery form a power pack. The electric motor and the power pack may be connected by an electric cable with the cable terminated at the electric motor by a personality module. The personality module may include a programming resistor that completes a voltage divider circuit to provide feedback for closed loop control of conditioned voltage at the electric motor. The personality module may further include a current limiting resistor to emulate the internal resistance of the secondary battery normally supplied with the tool.

The power conditioning circuit may convert power to a different voltage and current than the power sources would normally supply if the power sources were directly attached to the electric motor. The power conditioning circuit may include a DC to DC converter or an inverter to provide AC power to the electric motor. The power conditioning circuit may also include a potentiometer for continuously variable speed control of the electric motor.

The present invention further includes methods of selecting one of multiple power sources. The automatic control first determines if a solar photovoltaic array is available, and if so, uses the solar voltaic array to supply power to the electric motor. If a solar voltaic array is unavailable, the automatic control second determines if mains electrical power is available, and if so, uses the mains electrical power to supply power to the electric motor. If mains electrical power is unavailable, the automatic control third determines if an external secondary battery is available, and if so, uses the external secondary battery to supply power to the electric motor. If an external secondary battery is unavailable, the automatic control fourth determines if an on-board secondary battery is available, and if so, uses the on-board secondary battery to supply power to the electric motor. If an on-board secondary battery is unavailable, the automatic control fifth determines if a primary battery is available, and if so, uses the primary battery to supply power to the electric motor.

If the various available power sources are inadequate to drive the motor, the controller shuts down the motor or any other electrical load to prevent damage. The controller can then go into a scavenger mode in which it uses the partially depleted primary cells and/or the solar array, if the solar array is not generating enough current to drive the motor, to charge the on-board secondary battery and, then, to charge the external secondary battery.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which.

DESCRIPTION OF THE PREFERRED EMBODIMENTS

It will be understood that the present invention may be embodied in other specific forms without departing from the spirit thereof. The present examples and embodiments, therefore, are to be considered in all respects as illustrative and not restrictive, and the invention is not to be limited to the details presented herein.

Figure 1:
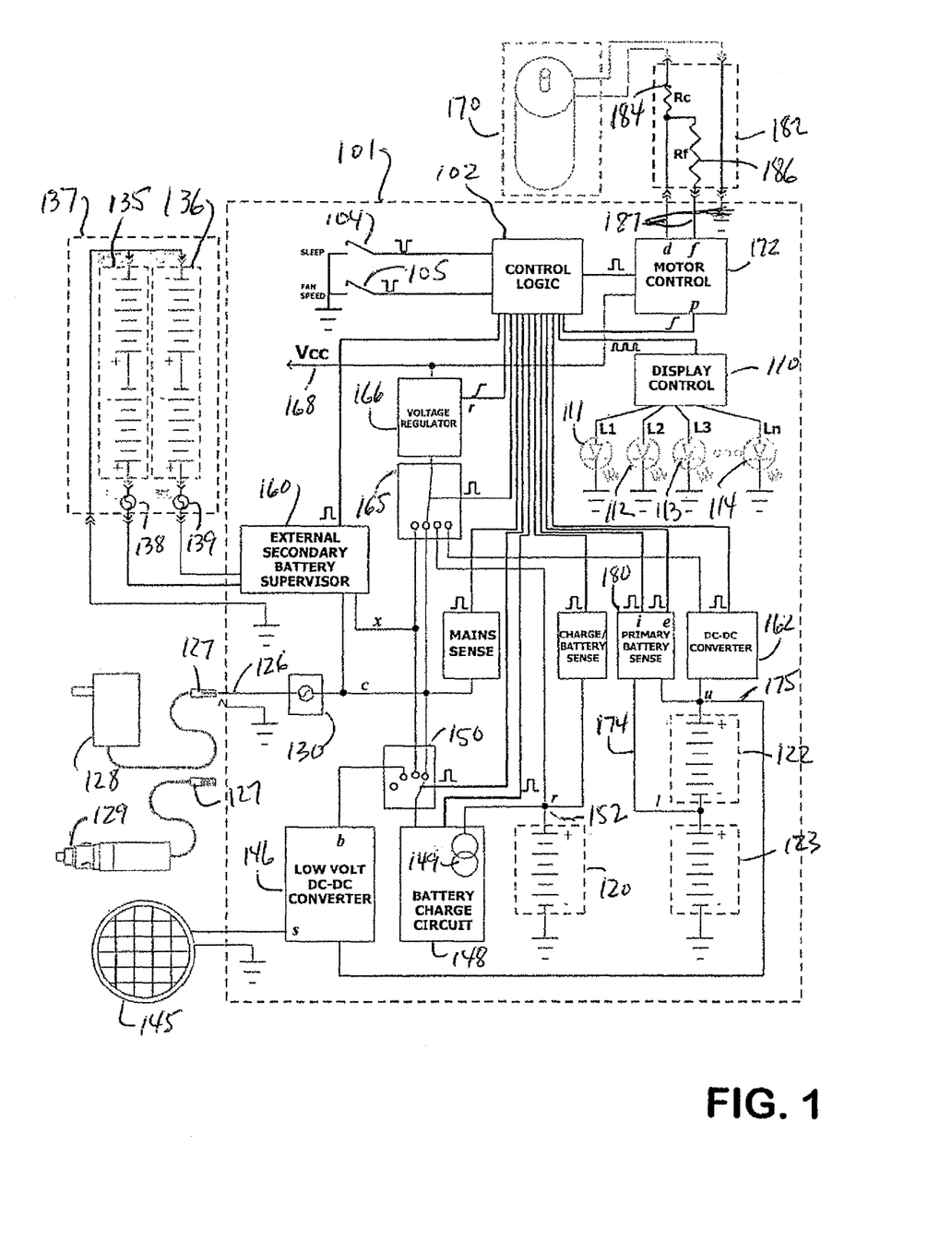
FIG. 1 is a diagrammatic and schematic view of intelligent motorized appliances with multiple power sources in accordance with the present invention.

With reference to FIG. 1, the core of the intelligent motorized appliance is an intelligent power pack 101, which includes control logic 102, which may be implemented as one or more micro-controllers, programmed gate array logic, discrete logic, or any combination thereof. The control logic 102 interfaces with the numerous switches, relays and sensors which together implement the intelligent power pack 101. The user interface includes a pair of momentary-ON switches 104 and 105 to signal a sleep operation (ON for fixed amount of time followed by shut-off) and to index through speeds from HIGH to LOW to OFF and any increments in between.

Part of the control is a display controller 110 that signals states and events through a series of light emitting diodes (LEDs) 111-114. Such events may be signaling incorrect primary battery installation, use of mains power, use of secondary (rechargeable) battery power, use of primary battery power, High/Low/Off motor speed and battery charging status (discharged, charging, full, fault states).

The intelligent power pack 101 has access to a number of power sources. Within the body of the intelligent power pack 101 are the rechargeable (secondary) battery 120 and the primary cell battery pack divided into an upper pack 122 and a lower pack 123. The intelligent power controller has access to external mains power through a jack 126 that is engaged by a plug 127 attached to either an AC adapter (wall mount power unit) 128 or to a cigarette lighter socket 129. Such sockets 129 typically provide about 12 VDC, but if a power protection circuit 130 includes a diode bridge circuit, then low voltage AC power may be provided at the jack as well.

The intelligent power pack 101 also has access to external battery packs 135 and 136 which mount to a battery adapter 137. The battery adapter 137 presents electrical contacts and mechanical mating features that allow different manufacturers' battery packs for portable tools to be accommodated by the adapter and make a secure electrical and mechanical connection therewith. Adapter 137 may also be equipped with a receptacle for receiving and holding standard rechargeable batteries, such as Li-Ion, NiCd or NiMH types, which can also be recharged by the intelligent power pack 101. The adapter 137 may also have some circuit protection hardware 138 and 139 to protect the batteries from short circuits and to protect the intelligent power pack circuitry.

The battery adapter 137 in turn is designed to be attached the body of the intelligent power pack 101 and make secure mechanical and electrical connection therewith. The purpose of this adapter 137 is to allow the intelligent power pack 101 to be customized by the end user to fit any number of styles of battery packs to the tool. If the user has 12 Volt Makita™ brand batteries, the user would install a battery adapter which accepted the desired kind of battery. If the user later disposes of the Makita tools and begins buying Ryobi™ 18 VDC tools, then the user can swap out the adapters to use the Ryobi 18 VDC batteries. Multiple battery adapters 137 may be used, which may be of different types, such that mixed types of batteries may be used with the same power pack 101.

Another source of external electric power is a photovoltaic (PV) solar cell array 145. Such arrays typically do not produce high voltages or consistent voltages and require power conditioning circuits, such as low voltage DC to DC converter 146, to boost and regulate the voltage. Energy storage is required to allow operation of the intelligent power pack after the sun goes down and to allow high power operation in short bursts, which is typical of power tools. If the PV solar cell array 145 does not have this storage and power conditioning, the intelligent power pack can still make use of the array's power output if it provides these functions onboard. In FIG. 1, the array 145 presents the power signal "s" to the input of a low voltage input DC to DC converter circuit 146. The output of the converter 146 is a high voltage power signal "b" which can be connected to a battery charger circuit 148 through an electronic switch 150. The energy from the PV array 145 is boosted to a voltage that the battery charger circuit 148 can use and then the energy is stored in the on-board secondary batteries 120. Charging current is provided by a current source 149 in the charger circuit 148 and delivered to the batteries 120 by signal "r" at node 152. A more elaborate intelligent power pack would be able to charge the external secondary batteries with suitable circuitry (not illustrated).

It should be noted that the battery charger circuit 148 for the on-board secondary batteries 120 has access to a number of power sources, which include from the aforementioned PV array 145 via the low voltage DC to DC converter 146, from the external secondary batteries 135-136 through an external secondary battery supervisor 160 via signal "x", and from mains power 128 or 129 through protection circuit 130 via signal "c". The intelligent power pack 101 also has another novel source of electric power in the depleted primary cell battery packs 122-123. Substantial energy capacity remains in typical primary batteries even when the output voltage or power output is not high enough to drive a motor 170. The output of the primary batteries 122-123 (signal "u") is fed into a DC-DC power supply 162 suitable for low voltage input. DC to DC power supply 162 could be same as the low voltage DC to DC converter 146 used with the PV array 145. Then, the depleted primary cells 122-123 can be used to charge the on-board secondary batteries 120 to extract as much energy out primary batteries 122-123 as possible.

The intelligent power pack 101 can also act as a conventional charging station if mains power 128 or 129 is present. The mains power, which is identified as signal "e", can be fed into the external secondary battery supervisor 160 if the latter is equipped with a battery charger circuit. It can also be used to charge the on-board secondary batteries 120.

The various sources of power (mains, battery) can be selected under logic control by using an electronic switch 165. Electronic switch 165 may utilize any of a number of methods known in the art such as electromechanical relays, power MOSFET switches, trials and other semiconductor devices. It is advantageous to have these power-level signals regulated to a stable voltage Vcc, which is also known as the power rail 168, as by using a voltage regulator 166. It may be advantageous to have this stable voltage Vcc selectable by the control logic 102, so that a variable level signal "r" is provided to the regulator 166 by the control logic 102. A large capacitor may also be used as part of the voltage regulator 166 to provide bursts of power to the motor 170, as needed.

The power from the various power sources could also be added together. For example, a time-division multiplexing scheme may be implemented, such as where each available power source charges a capacitor and the capacitors are switched in sequence to the load, such as a motor. The switching may be timed so that when the voltage on one of the capacitors drops below the voltage Vcc, the capacitor associated with the next power source is switched in, allowing the prior power source to recharge its capacitor. Similar schemes can be implemented to step-up voltages from lower voltage power sources. Such schemes may be used in the absence of mains power, which is always assumed to be separately adequate, if available. Such schemes may also use depleted primary batteries to add their residual power to the secondary batteries, thereby extending the life of the secondary batteries, or to supplement inadequate solar power with primary or secondary batteries.

It will be appreciated by those skilled in the art that the voltage regulator 166 and the electronic switch 165 could be replaced with a circuit which could add together power inputs from all sources automatically. For example, use mains power 128 or 129 if that is available and is sufficient. If mains power alone is not sufficient, power from the external secondary batteries 135-136 may be added, and then power from the on-board secondary batteries 120 may be added, and finally, power from primary batteries 122-123 may be added to satisfy demand from the motor 170 and to keep a stable voltage Vcc on the rail 168.

It may be advantageous for the voltage Vcc to be raised or lowered depending upon the needs of the attached tool or appliance. For example, if the tool operates at 18 VDC, it would be inefficient to boost the rail voltage much above that, even if the batteries were capable of supplying 24 or 36 Volts.

The most important consumer of the power off the Vcc rail 168 is the motor 170. It may be advantageous to provide on-board control of output voltage Vcc especially if the motor 170 does not have its own controller. The control logic 102 provides a variable level signal "p" to a motor control 172, and the motor control 172 provides a power signal "d" to the motor. Motor control 172 can also receive other control signals from the control logic 102 and send back sense information such as overheating or stalling.

There are other sensors within the intelligent power pack 101. Preferably, each battery has its own sense circuit that can detect presence (for removable packs or cells), charge state (discharged, charging, full) and fault state (shorted, reverse polarity). In the case of the primary batteries 122-123, it is advantageous for the pack to have a center tap, signal "I" on line 174, which can be used in conjunction with power signal "u" on line 175, to determine certain fault states within the battery pack 122-123. A difference equal to the potential of two single cells denotes a reversed cell. A difference of less than the two-cell potential indicates a dead battery or mixed old and new batteries. A battery sense circuit 180 then presents a signal "i" to denote a fault condition. If the upper and lower battery packs are balanced (their difference less than 0.1 VDC) but the total voltage at "u" is not high enough, then another signal line "e" is activated to denote an exhausted condition.

Similar circuits may be used to present status signals to the control logic from the onboard secondary batteries 120, the mains power source 128-129 and the external secondary batteries 135-136. It is important to sense the charge state of the secondary batteries 135-136 because over-discharging and over-charging can either destroy the battery or at least greatly reduce its capacity.

Note further that the various sensors could be separate circuits dedicated to the purpose, or be implemented as algorithms in control logic. For example, the control logic may be programmed into a microcontroller which is equipped with analog to digital conversion circuitry.

Since the various battery packs 120, 135 and 136 may all present different potentials to the voltage regulator 166, it may be necessary to provide DC-DC converters to boost or lower voltages at the output of the battery pack to provide optimum operation of the electronic switch 165 or regulator 166. For example, if the voltage regulator 166 is a simple linear type, the input voltage must be higher than the output voltage by an amount called the dropout voltage. If the Vcc rail 168 needs to be higher than the output voltage of the selected battery pack, then that pack voltage must be boosted to the rail voltage plus the dropout voltage. A switching type regulator in a boost or flyback configuration would be needed in this case. In FIG. 1 this DC-DC converter 162 is shown in-line with the output of the primary battery pack 122-123.

The motor control 172 takes power off of the power rail 168 and takes feedback voltage "f" from the tool or motor adapter 182 to adjust the output voltage of the motor control at output "d".

The power signal "d" is presented to the motor 170 through current limiting resistor 184. The feedback resistor 186 may be the high side of a voltage divider in the motor control 172. With the use of a fixed voltage reference in the motor control 172, the voltage at the output "d" can be programmed by the resistor 186 which is in the tool adapter 182. Thus the tool adapter 182 can emulate a rechargeable battery that does not get exhausted. To protect against short circuits and to better emulate the internal resistance of a real battery, the current limiting resistor 184 lowers the voltage presented to the motor 170 as current presented to the motor 170 increases.

The motor control 172 may also act in a follower mode where the potential of signal "d" is made to follow the control potential of signal "p", which is received by the motor control 172 from the control logic 102. For example, this would be more useful if the tool 170 were a fan device or a pump and the user wished to adjust power output from the intelligent power pack 101 rather than on the motor unit 170.

It can be seen, now, that the tool adapter 182 can be made to emulate the mechanical and electrical properties of a rechargeable battery pack without the use of rechargeable batteries. Further the power supply is not limited to the rechargeable batteries supplied with the portable tool 170. The external secondary batteries 135-136 can be used even though it might have a different voltage and/or mechanical format by converting the voltage to one needed by the tool 170 and even adding together the current from multiple batteries, or even batteries of different types. The only requirement is that the power available from the batteries exceeds the power required by the motor 170 and any losses occurring from the power or voltage conversion.

If the tool adapter 182 and intelligent power pack 101 are connected by a length of electrical cord, such as the 3-conductor cord 187 shown in FIG. 1, then the tool 170 may be used remotely from the intelligent power pack. Also, if the motor control 172 is replicated, with suitable adjustment to the design of the control logic 102, display control 110 and user input switches 150 and 165, then multiple tools 170 can be operated from the same intelligent power pack 101, without having to disconnect the tools 170 or exchange tool adapters 182.

If the intelligent power pack 101 is packaged in an enclosure that is wearable (such as, attached to a waist belt), then the weight of the batteries 120, 122-123 and 135-136 is not borne by the hand and wrist, but rather the torso. This makes the tool 170 (such as, a drill motor) considerably lighter and more maneuverable. The user is less likely to get fatigued and will be more productive for longer periods of time. The tether or attachment means would be only a minor inconvenience and may protect the power pack 101 in case the tool 170 is accidentally dropped.

If the tool adapter 182 is further supplied with a hook or loop or similar hanging device and the intelligent power pack 101 is outfitted with mating connectors, then a tool 170 not being currently used may be attached to the intelligent power pack temporarily. This also improves the end user's productivity.

Figure 2:
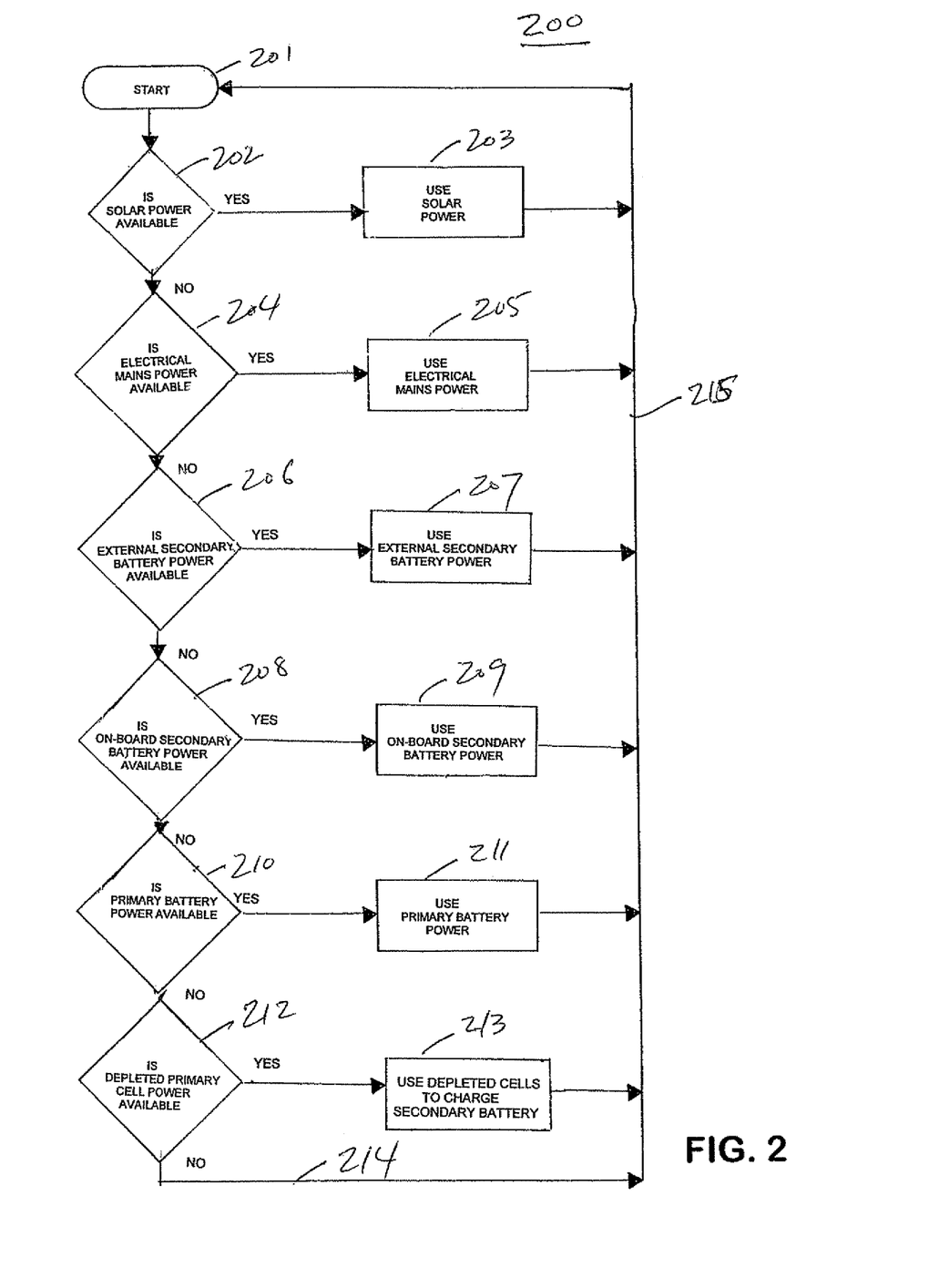
FIG. 2 is a flow chart of the steps which the intelligent motorized device of FIG. 1 may execute in selecting one of multiple power sources.

Another aspect of the present invention includes methods for automatically selecting one of multiple power sources for an electric load, such as a motorized appliance. With reference to the flow chart 200 shown in FIG. 2, the intelligent power pack 101, after initialization at the Start bubble 201, determines if a solar photovoltaic array is available at decision block 202. If so, the solar voltaic array is used to supply power to the electric load at block 203. If solar power is unavailable, power pack 101 determines at decision block 204 if mains electrical power is available. If so, mains electrical power is used to supply power to the electric load at block 205. If mains power is unavailable, power pack 101 determines at decision block 206 if an external secondary battery is available. If so, the external secondary battery is used to supply power to the electric load at block 207. If an external secondary battery is unavailable, power pack 101 determines at decision block 208 if an on-board secondary battery is available. If so, the on-board secondary battery is used to supply power to the electric load at block 209. If the on-board secondary battery is unavailable, power pack 101 determines if a primary battery is available at decision block 210. If so, power pack 101 uses the primary battery to supply power to the electric load at block 211. If the primary battery is unavailable, power to the motor or to any other electrical load is disengaged, and power pack 101 determines if depleted primary cells are available at decision block 212. If so, the depleted primary cells are used to charge the on-board secondary batteries at block 213. When residual power is no longer available from the depleted primary cells, the power source selection process returns to the Start bubble 201 via lines 214 and 215. If any previously selected power source later becomes unavailable or is no longer able to supply the needed level of power, the selected power source at blocks 203, 205, 207, 209, 211 or 213 is disengaged from the motor or other electrical load and the power source selection process returns to the Start bubble via line 215.

Figure 3:
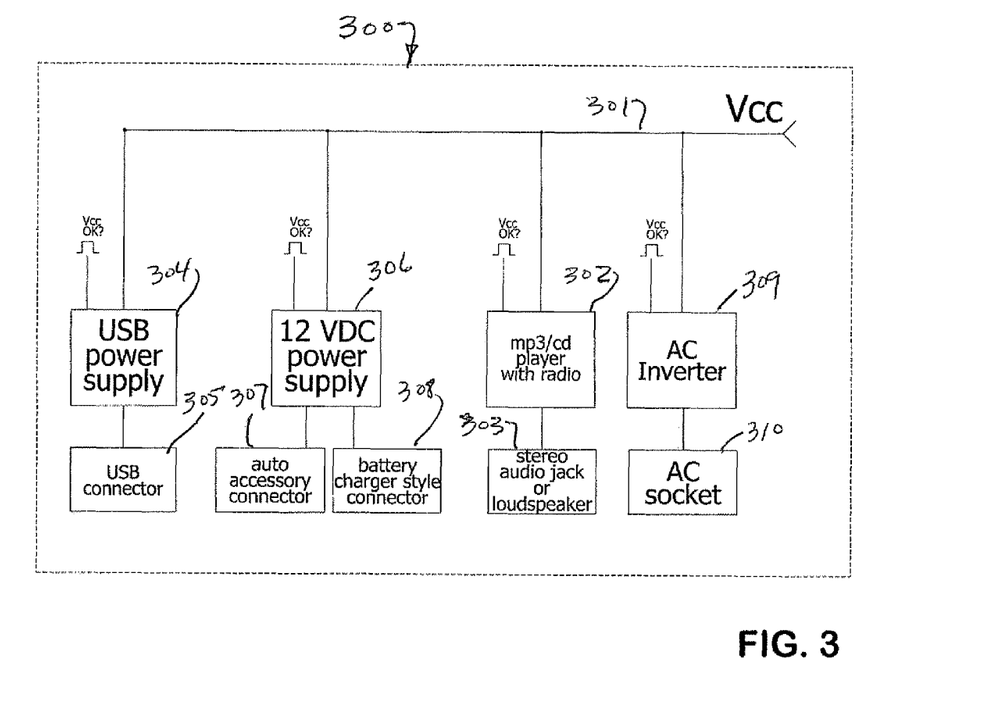
FIG. 3 is block diagram of the intelligent motorized appliance of FIG. 1 with other appliances.

Another embodiment of the present invention, as shown in FIG. 3, utilizes other accessories with an intelligent power pack 300. For example, the accessories may include a radio, CD player and/or an MP3 player 302 which has an output audio means, such as an audio jack or loudspeaker 303. A USB connector 305 may be connected to a standard USB bus which supplies at least 500 mA of current at 5 volts DC. Thus, USB power supply 304 supplies 5 volts DC to a power rail 301, and Vcc is 5 volts. Alternatively, an auto accessory connector 307 supplies power to a 12 volt DC power supply 306, which supplies 12 volts DC to power rail 301. For example, auto accessory connector 307 may be cylindrical in configuration and suitable for insertion into a vehicular cigarette lighter connector, such as connector 129 in FIG. 1. Power supply 306 may alternatively receive power from a battery charger style connector 308. Power rail 301 may also receive power from an AC inverter 309 which receives power from an AC socket 310 which may be connected to 120 VAC, 60 Hz electrical mains used in North America. For example, socket 310 may be similar to AC adapter 128 shown in FIG. 1.

In a manner similar to the intelligent power pack 101 in FIG. 1, the intelligent power pack 300 in FIG. 3 may utilize power conditioning means to convert power from multiple power sources. The power conditioning means may also be provided with indicator lamps to indicate at least one abnormal condition. The power conditioning means may set a logic signal used by a voltage regulator to signify sufficient voltage Vcc on the power rail 301. A mechanical or electronic timer may be used to turn off power after a fixed amount of time. The intelligent power pack may further include a thermostat to turn off power when the temperature exceeds a certain limit (such as for cooling applications), or turns off power when the temperature drops below a lower limit. For example, the power may be turned off to a cooling fan when the temperature drops below the lower limit.

It can be seen that the intelligent power pack 300 creates a mobile power station for operating a large number of different types of electronic devices or appliances, or charging their batteries, as long as the device or appliance can be operated or charged off of an auto accessory/cigarette lighter receptacle, from a USB connector, or from AC mains. A limitation is that the power drawn by the device or appliance needs to be less than the power available from the selected power source less any power conversion inefficiency or loss.

Above, the relevant prior art is disclosed and analyzed for similarities and dissimilarities with the present invention. Then, the invention with its several embodiments and numerous improvements were presented in detail. Thus, the preceding disclosure provides a detailed background into providing a power tool, electric fan, lamp, or the like, especially one that has a wearable power module, which automatically operates from one of multiple available power sources.

While particular embodiments of the invention have been shown and described, it will be obvious to those skilled in the art that changes and modifications may be made therein without departing from the invention in its broader aspects.

The invention claimed is:

1. A motorized portable appliance comprising:
   an electric motor;
   a secondary battery as a source of electrical power for the electric motor;
   at least one other source of electrical power for the electric motor; and
   an automatic control to switch between said secondary battery and said at least one other source of electrical power to provide electrical power to said electric motor;
   wherein said automatic control uses an order of priority in selecting one of multiple sources of electrical power.

2. The motorized portable appliance as claimed in claim 1, said automatic control including a power conditioning circuit to convert power from said secondary battery and from said other source of electrical power to provide electrical power at a voltage, phase, and frequency compatible with said electric motor.

3. The motorized portable appliance as claimed in claim 1, wherein said other source of electrical power is mains electrical power.

4. The motorized portable appliance as claimed in claim 3, wherein said mains electrical power comes from an AC adapter.

5. The motorized portable appliance as claimed in claim 3, wherein said mains electrical power comes from a plug for a cigarette lighter socket to provide electrical power from an automotive battery.

6. The motorized portable appliance as claimed in claim 3, wherein said mains electrical power comes from a solar photovoltaic array.

7. The motorized portable appliance as claimed in claim 3, said automatic control having a charging means to charge the secondary batteries from the mains electrical power.

8. The motorized portable appliance as claimed in claim 1, said other source of electrical power having at least one primary battery.

9. The motorized portable appliance as claimed in claim 1, further comprising a sense means for detecting at least one abnormal condition, said at least one abnormal condition selected from a group consisting of a reversed cell in a battery, a mix of battery types, a shorted battery, or a mix of old and new batteries, said sense means activating an indicator upon detecting any such a condition.

10. The motorized portable appliance as claimed in claim 1, said automatic control including a voltage conversion means which uses partially depleted primary batteries to recharge said secondary battery.

11. The motorized portable appliance as claimed in claim 1, said automatic control including a voltage conversions means which uses current from solar photovoltaic cells to recharge the secondary batteries.

12. The motorized portable appliance as claimed in claim 1, wherein the automatic control has a receptacle for receiving additional secondary batteries to increase power capacity.

13. The motorized portable appliance as claimed in claim 12, wherein the receptacle includes an adapter for mechanically and electrically mating an external secondary battery with the motorized portable appliance.

14. The motorized portable appliance as claimed in claim 13, said automatic control including a charging means to charge the secondary battery from the external secondary battery.

15. The motorized portable appliance as claimed in claim 1, wherein said automatic control first determines if a solar photovoltaic array is available, and if so, uses the solar voltaic cell to supply power to the electric motor.

16. The motorized portable appliance as claimed in claim 15, wherein said automatic control second determines if mains electrical power is available, and if so, uses the mains electrical power to supply power to the electric motor.

17. The motorized portable appliance as claimed in claim 16, wherein said automatic control third determines if an external secondary battery is available, and if so, uses the external secondary battery to supply power to the electric motor.

18. The motorized portable appliance as claimed in claim 17, wherein said automatic control fourth determines if an on-board secondary battery is available, and if so, uses the on-board secondary battery to supply power to the electric motor.

19. The motorized portable appliance as claimed in claim 18, wherein said automatic control fifth determines if a primary battery is available, and if so, uses the primary battery to supply power to the electric motor.

20. The motorized portable appliance as claimed in claim 19, wherein said automatic control sixth determines if depleted primary cells are available, and if so, uses the depleted primary cells to charge the on-board secondary battery or the external secondary battery.

21. The motorized portable appliance as claimed in claim 1, wherein said automatic control includes a power conditioning circuit to convert power to a different voltage and current than the power sources would normally supply if the power sources were directly attached to the electric motor.

22. The motorized portable appliance as claimed in claim 21, wherein said power conditioning circuit includes a DC to DC converter.

23. The motorized portable appliance as claimed in claim 22, wherein said power conditioning circuit includes an inverter to provide AC power to the electric motor.

24. The motorized portable appliance as claimed in claim 21, wherein said power conditioning circuit includes a potentiometer for continuously variable speed control of the electric motor.

25. The motorized portable appliance as claimed in claim 21, wherein the power conditioning circuit and an on-board secondary battery form a power pack.

26. The motorized portable appliance as claimed in claim 25, wherein electric motor and the power pack are connected by an electric cable with the cable terminated at the electric motor by a personality module.

27. The motorized portable appliance as claimed in claim 26, wherein the personality module includes a programming resistor that completes a voltage divider circuit to provide feedback for closed loop control of conditioned voltage at the electric motor.

28. The motorized portable appliance as claimed in claim 26, wherein the personality module includes a current limiting resistor to emulate the internal resistance of the secondary battery.

29. A method for automatically selecting one of multiple power sources for an electric load, said method comprising the steps of:
   determining if a solar photovoltaic array is available, and if so, using the solar voltaic cell to supply power to the electric load,
   if a solar photovoltaic array is not available, determining if mains electrical power is available, and if so, using the mains electrical power to supply power to the electric load, and
   using an automatic control with an order of priority in selecting one of multiple sources of electrical power.

30. The method for automatically selecting one of multiple power sources as claimed in claim 29, said method comprising the additional step of:
   determining if an external secondary battery is available, and if so, using the external secondary battery to supply power to the electric load.

31. The method for automatically selecting one of multiple power sources as claimed in claim 30, said method comprising the additional step of:
   determining if an on-board secondary battery is available, and if so, using the on-board secondary battery to supply power to the electric load.

32. The method for automatically selecting one of multiple power sources as claimed in claim 31, said method comprising the additional step of:
   determining if a primary battery is available, and if so, using the primary battery to supply power to the electric load.

33. The method for automatically selecting one of multiple power sources as claimed in claim 29, said method comprising the additional step of:
   if a primary battery is not available, determining if depleted primary cells are available, and if so, using the depleted primary cells to charge the on-board secondary battery or the external secondary battery.

34. An intelligent power pack for supplying electrical power to an electrical load, said intelligent power pack comprising:

a secondary battery as a source of electrical power for the electrical load;

at least one other source of electrical power for the electrical load; and an automatic control to switch between said secondary battery and said at least one other source of electrical power to provide electrical power to said electrical load;

wherein said automatic control uses an order of priority in selecting one of multiple sources of electrical power.

35. The intelligent power pack as claimed in claim 34, said automatic control including a power conditioning circuit to convert power from said secondary battery and from said other source of electrical power to provide electrical power at a voltage, phase, and frequency compatible with said electrical load.

36. The intelligent power pack as claimed in claim 34, wherein said other source of electrical power is mains electrical power.

37. The intelligent power pack as claimed in claim 36, wherein said mains electrical power comes from an AC adapter.

38. The intelligent power pack as claimed in claim 36, wherein said mains electrical power comes from a plug for a cigarette lighter socket to provide electrical power from an automotive battery.

39. The intelligent power pack as claimed in claim 36, wherein said mains electrical power comes from a solar photovoltaic array.

40. The intelligent power pack as claimed in claim 36, said automatic control having a charging means to charge the secondary batteries from the mains electrical power.

41. The intelligent power pack as claimed in claim 34, said other source of electrical power having at least one primary battery.

42. The intelligent power pack as claimed in claim 34, further comprising a sense means for detecting at least one abnormal condition, said at least one abnormal condition selected from a group consisting of a reversed cell in a battery, a mix of battery types, a shorted battery, or a mix of old and new batteries, said sense means activating an indicator upon detecting any such a condition.

43. The intelligent power pack as claimed in claim 34, said automatic control including a voltage conversion means which uses partially depleted primary batteries to recharge said secondary battery.

44. The intelligent power pack as claimed in claim 34, said automatic control including a voltage conversions means which uses current from solar photovoltaic cells to recharge the secondary batteries.

45. The intelligent power pack as claimed in claim 34, wherein the automatic control has a receptacle for receiving additional secondary batteries to increase power capacity.

46. The intelligent power pack as claimed in claim 45, wherein the receptacle includes an adapter for mechanically and electrically mating an external secondary battery with the electrical load.

47. The intelligent power pack as claimed in claim 34, wherein said automatic control first determines if a solar photovoltaic array is available, and if so, uses the solar voltaic cell to supply power to the electrical load.

48. The intelligent power pack as claimed in claim 47, wherein said automatic control second determines if mains electrical power is available, and if so, uses the mains electrical power to supply power to the electrical load.

49. The intelligent power pack as claimed in claim 48, wherein said automatic control third determines if an external secondary battery is available, and if so, uses the external secondary battery to supply power to the electrical load.

50. The intelligent power pack as claimed in claim 49, wherein said automatic control fourth determines if an on-board secondary battery is available, and if so, uses the on-board secondary battery to supply power to the electrical load.

51. The intelligent power pack as claimed in claim 50, wherein said automatic control fifth determines if a primary battery is available, and if so, uses the primary battery to supply power to the electrical load.

52. The intelligent power pack as claimed in claim 51, wherein said automatic control sixth determines if depleted primary cells are available, and if so, uses the depleted primary cells to charge the on-board secondary battery or the external secondary battery.

53. The intelligent power pack as claimed in claim 34, wherein said automatic control includes a power conditioning circuit to convert power to a different voltage and current than the power sources would normally supply if the power sources were directly attached to the electrical load.

54. An intelligent power pack for supplying electrical power to an electrical load, said intelligent power pack comprising:

a USB power supply as a source of electrical power for an electrical load;

a 12 volt DC power supply connectible to a vehicular battery as a source of electrical power for an electrical load; and an automatic control to switch between said USB power supply and said 12 volt DC power supply to provide electrical power to said electrical load wherein said automatic control uses an order of priority in selecting one of multiple sources of electrical power.

55. The intelligent power pack as claimed in claim 54, further comprising:

a 120 volt AC power supply as a source of electrical power for an electrical load, said automatic control to switch between said USB power supply, said 12 volt DC power supply, and said 120 volt AC power supply to provide electrical power to said electrical load.

56. The intelligent power pack as claimed in claim 54, said automatic control including a power conditioning circuit to convert power from said USB power supply and from said 12 volt DC power supply to provide electrical power at a voltage, phase, and frequency compatible with said electrical load.

* * * * *